(12) United States Patent
Wolf et al.

(10) Patent No.: US 11,716,716 B2
(45) Date of Patent: Aug. 1, 2023

(54) BARRAGE SIGNAL FOR PROTECTING WIRELESS COMMUNICATIONS

(71) Applicant: QUALCOMM Incorporated, San Diego, CA (US)

(72) Inventors: Guy Wolf, Rosh Haayin (IL); Assaf Touboul, Netanya (IL); Ory Eger, Tel Aviv (IL); Sharon Levy, Binyamina (IL); Noam Zach, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 17/165,986

(22) Filed: Feb. 3, 2021

(65) Prior Publication Data

US 2022/0248386 A1    Aug. 4, 2022

(51) Int. Cl.
*H04L 5/00* (2006.01)
*H04W 72/02* (2009.01)
*H04W 72/044* (2023.01)

(52) U.S. Cl.
CPC ......... *H04W 72/046* (2013.01); *H04L 5/0053* (2013.01)

(58) Field of Classification Search
CPC ............... H04W 72/046; H04L 5/0053; H04K 2203/36; H04K 2203/32; H04K 2203/18
See application file for complete search history.

(56) References Cited

U.S. PATENT DOCUMENTS

| 6,154,486 | A * | 11/2000 | Scott | H04W 56/003 375/E1.018 |
| 9,107,089 | B2 * | 8/2015 | Kasslin | H04W 16/14 |
| 9,473,946 | B2 * | 10/2016 | Kasslin | H04W 16/14 |
| 10,951,296 | B1 * | 3/2021 | Li | H04L 27/2614 |
| 11,545,759 | B2 * | 1/2023 | Lee | H01Q 3/44 |
| 2013/0266142 | A1 * | 10/2013 | Hwang | H04W 12/76 380/270 |
| 2018/0343588 | A1 * | 11/2018 | Sadek | H04W 28/26 |
| 2020/0396765 | A1 * | 12/2020 | Liang | H04L 1/0027 |
| 2021/0036800 | A1 | 2/2021 | Berliner et al. | |
| 2022/0225312 | A1 * | 7/2022 | Levitsky | H04B 7/0695 |
| 2022/0248386 | A1 * | 8/2022 | Wolf | H04K 3/825 |

FOREIGN PATENT DOCUMENTS

WO    WO-2020075044 A1 *   4/2020   ......... H04B 7/18519

OTHER PUBLICATIONS

3GPP TSG-RAN WG4#74, R4-143322 simulation on the impact of gain/phase coherency impacton EIRP and sidelobe suppression variation (Year: 2014).*
3GPP TSG GERAN # 49, Tdoc GP-110146 Frequency Mapping of Precoded EGPRS2 (Year: 2011).*

* cited by examiner

*Primary Examiner* — Diane L Lo
*Assistant Examiner* — Abusayeed M Haque
(74) *Attorney, Agent, or Firm* — The Marbury Law Group, PLLC

(57) ABSTRACT

In embodiments of systems and methods for protecting wireless communications a base station and the wireless device, a base station receive from a wireless device channel feedback from a wireless device regarding a communication beam between the base station and the wireless device, generate a barrage signal precoder based on the received channel feedback regarding the communication beam, and transmit a barrage signal using the barrage signal precoder on a second beam that is different from the communication beam.

18 Claims, 11 Drawing Sheets

BARRAGE SIGNAL FOR PROTECTING WIRELESS COMMUNICATIONS

BACKGROUND

In Long Term Evolution (LTE) Fifth Generation (5G) New Radio (NR) and other communication technologies, network elements such as base stations and wireless devices may employ beamforming techniques to form highly directional transmissions. However, such beams are not perfectly directional, and a signal formed for communication between a base station in a wireless device may include sidelobes that propagate from the transmitter in other directions. A potential security risk exists where an eavesdropper may be positioned to receive a sidelobe, and may attempt to listen in on the signal. Such sidelobes may contain the same information as the beam in the target angle, and may include sufficient gain to enable the eavesdropper to adequately receive the signal.

SUMMARY

Various aspects include systems and methods performed by base stations for protecting wireless communications.

Various aspects performed by a processor of a base station may include receiving, from a wireless device, channel feedback from a wireless device regarding a communication beam between the base station and the wireless device, generating a barrage signal precoder based on the received channel feedback regarding the communication beam, and transmitting a barrage signal using the barrage signal precoder on a second beam that is different from the communication beam. Some aspects may further include generating a communication beam precoder based on the received channel feedback regarding the communication beam, and generating the barrage signal precoder based on the communication beam precoder. In some aspects, the generated barrage signal precoder may be orthogonal to the communication beam precoder.

In some aspects, transmitting a barrage signal using the barrage signal precoder on a second beam that is different from the communication beam may include transmitting the barrage signal on the second beam in a sidelobe of the communication beam. In some aspects, generating a barrage signal precoder based on the received channel feedback regarding the communication beam may include determining whether a message to be sent to the wireless device includes an indication that the message should be protected, and generating the barrage signal precoder based on the received channel feedback regarding the communication beam in response to determining that the message to be sent to the wireless device includes the indication that the message should be protected.

In some aspects, generating a barrage signal precoder based on the received channel feedback regarding the communication beam may include determining whether a message to be sent from the wireless device to the base station includes an indication that the message should be protected, and generating the barrage signal precoder based on the received channel feedback regarding the communication beam in response to determining that the message to be sent to the wireless device includes the indication that the message should be protected.

In some aspects, transmitting a barrage signal using the barrage signal precoder on a second beam that is different from the communication beam may include transmitting a barrage signal using the barrage signal precoder on the second beam that is different from the communication beam while a message to be protected is being sent between the base station and the wireless device. Some aspects may include stopping transmission of the barrage signal after the message to be protected has been sent. In some aspects, receiving, from a wireless device, channel feedback from a wireless device regarding a communication beam between the base station and the wireless device may include determining whether a message to be sent to the wireless device includes an indication that the message should be protected, sending to the wireless device scheduling information to schedule the channel feedback in response to determining that the message to be sent to the wireless device includes the indication that the message should be protected, and receiving from the wireless device the channel feedback regarding the communication beam between the base station and the wireless device according to the scheduling information.

Further aspects include a base station computing device having a processor configured to perform one or more operations of any of the methods summarized above. Further aspects include a non-transitory processor-readable storage medium having stored thereon processor-executable instructions configured to cause a processor of a base station computing device to perform operations of any of the methods summarized above.

DETAILED DESCRIPTION

Figure 1:
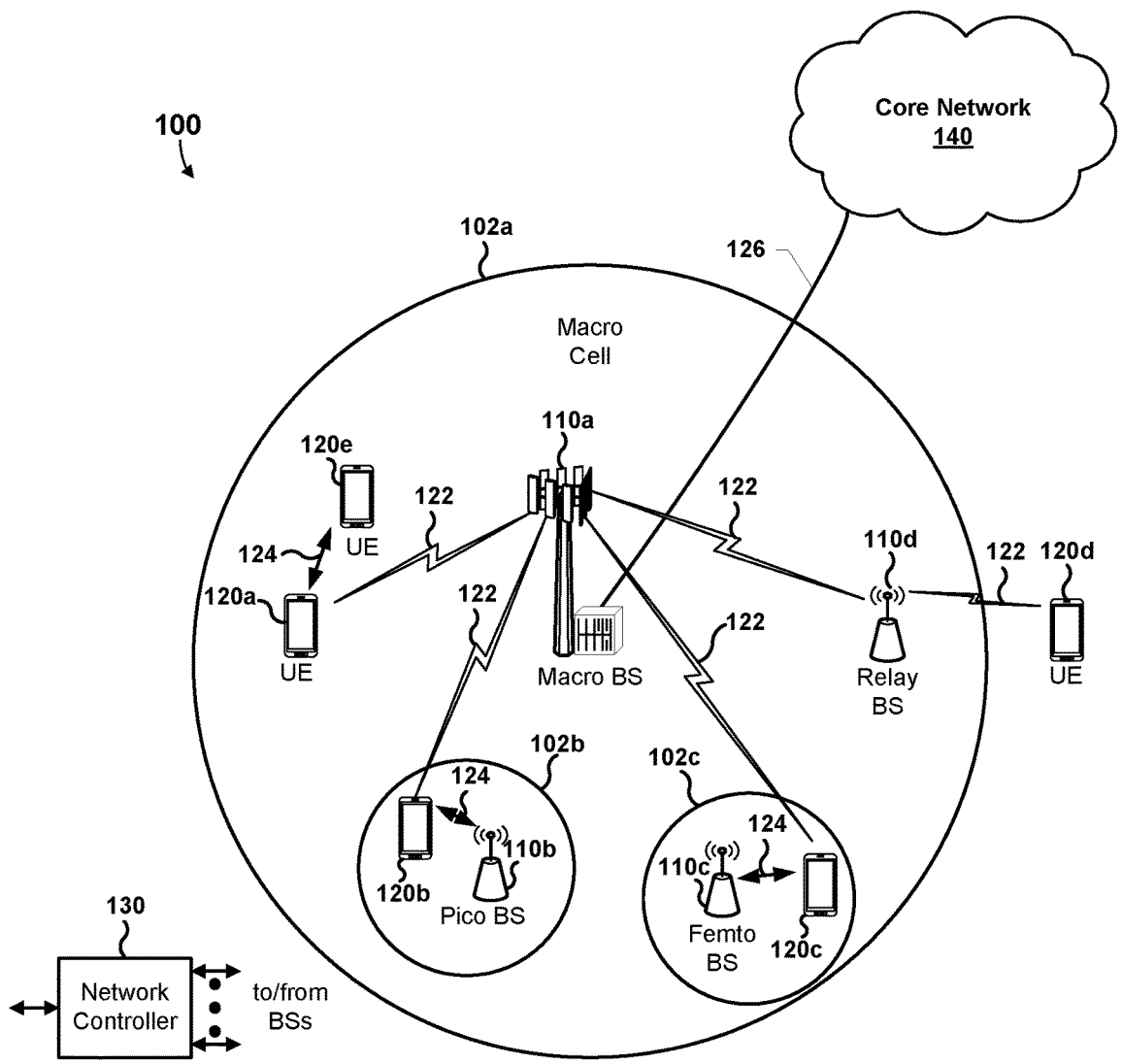
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for protecting wireless communications between a base station and a wireless device. In various embodiments, a base station may receive channel feedback from a wireless device regarding a communication beam between the base station and the wireless device. The base station may generate a precoder for the communication beam between the base station and the wireless device based on the received channel feedback. The base station also may generate a barrage signal precoder based on the received channel feedback regarding the communication beam. The base station may employ the barrage signal precoder to transmit a barrage signal on a second beam that is different from the communication beam. For example, the base station may transmit the barrage signal in one or more directions other than the direction of the communication beam between the base station and the wireless device. In this manner, the base station may generate and transmit directional noisy signals in order to jam reception by an eavesdropper of wireless communications between the base station and the wireless device. In some embodiments, the base station may transmit the barrage signal for a limited time, or to jam the reception of a particular communication or group of communications, or of a particular message or group of messages. Thus, various embodiments improve the security of wireless communications between the base station and the wireless device.

The term "barrage signal" is used herein to refer to a noise signal (e.g. a non-informational signal) transmitted to drown out, overwhelm, or jam reception of an informational signal (e.g., a communication beam between a base station and a wireless device) outside of a communication beam, such as in sidelobes of the communication beam. In some embodiments, a barrage signal may be spatially colored. In some embodiments, the barrage signal may include spatially colored noise (such as white noise, pink noise, etc.). In some embodiments, the barrage signal may include band limited pseudo noise.

The term "wireless device" is used herein to refer to any one or all of user equipment (UE), cellular telephones, smartphones, portable computing devices, wireless router devices, wireless appliances, personal or mobile multimedia players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

In Long Term Evolution (LTE) Fifth Generation (5G) New Radio (NR) and other communication technologies, network elements such as base stations and wireless devices may employ beamforming techniques to form highly directional transmissions. However, a signal formed for communication between a base station and a wireless device transmission in one direction (a target angle) may include sidelobes that propagate in other directions. Eavesdropper may attempt to listen in on communications between the base station and the wireless device by receiving a sidelobe.

Various embodiments include methods and base stations configured to perform the methods of protecting wireless communications. Various embodiments enable the base station to generate and transmit a barrage signal (a jamming signal) and one or more directions other than a direction between the base station and a wireless device. In various embodiments, the base station may generate a beam formed barrage signal for transmission in the one or more other directions.

In some embodiments, the base station may receive from the wireless device channel feedback from a wireless device regarding a communication beam between the base station and the wireless device. In some embodiments, the channel feedback may include Channel State Information (CSI), a Sounding Reference Signal (SRS), or another suitable message or signal received by the base station from the wireless device that provides information about one or more parameters of the communication beam between the base station on the wireless device. In some embodiments, the base station may generate a precoder for the communication beam (a communication beam precoder) based on the channel feedback. The base station may use the communication beam precoder for forming and/or adjusting the communication beam between the base station and the wireless device.

In some embodiments, the communication beam precoder may not be perfectly aligned to the communication beam, for example, due to imperfect feedback, channel variation, limitations in beamformer design, and/or other factors. A communication beam formed using the communication beam precoder may include sidelobes that propagate in directions other than the intended direction of the communication beam (e.g., between the base station and the wireless device).

In some embodiments, the base station may generate a barrage signal precoder based on the received channel feedback regarding the communication beam. In some embodiments, the base station may generate the barrage signal precoder based on the communication beam precoder. In some embodiments, the generated barrage signal precoder may be orthogonal to the communication beam precoder. In some embodiments, the barrage signal precoder may be expressed as $W_2=I-W_1 W_1^\dagger=I-(W_1^H W_1)^{-1} W_1^H$, where $W_2$ represents the barrage signal precoder, I represents an identity matrix, $W_1$ represents the communication beam precoder, $\dagger$ represents a pseudoinverse, and H represents a transform (such as a Hermite transform).

In some embodiments, the base station may transmit a barrage signal using the barrage signal precoder on the second beam that is different from the communication beam. For example, the base station may transmit the second beam in a second direction. In some embodiments, the base station may transmit the barrage signal into a null space the communication beam. In some embodiments, the base station may transmit the barrage signal on the second beam in a sidelobe of the communication beam.

In some embodiments, the base station may dynamically generate the barrage signal precoder. In some embodiments, the base station may selectively or dynamically transmit (or generate and transmit) the barrage signal. In some embodiments, the base station may transmit the barrage signal for a period of time. In some embodiments, the base station may transmit the barrage signal to cover the transmission of a signal or signals. In some embodiments, the base station may transmit the barrage signal to cover the transmission of a message or messages.

In some embodiments, a determination may be made (e.g., by a base station) whether a message to be sent to the wireless device includes an indication that the message should be protected. In some embodiments, the base station may generate the barrage signal precoder in response to determining the message to be sent to the wireless device includes the indication that the message should be protected. In some embodiments, the message may be associated with or may include an indication that the message should be protected. In some embodiments, a message may include a Quality of Service (QOS) indication (such as a flag, a bit, or another suitable indication) that the message it should be protected. In some embodiments, the base station may receive control signaling or out-of-band signaling indicating that the message should be protected. In some embodiments, the message may be associated with metadata indicating that the message should be protected. In some embodiments, a data packet of the message may include the indication in a packet header or in a packet payload that a message in the data packet or in other data packets should be protected. Other suitable indications are also possible.

In some embodiments, in response to detecting the indication that the message should be protected, the base station may generate and transmit the barrage signal. In some embodiments, the base station may transmit the barrage signal while the message requiring protection is being sent (or any other suitable time). In some embodiments, the base station may stop the transmission of the barrage signal after the message(s) have been sent (or any other suitable time).

In some embodiments, the base station may determine whether a message to be sent from the wireless device to the base station includes an indication that the message should be protected. In some embodiments, in response to detecting the indication that the message should be protected, the base station may generate and transmit the barrage signal. In some embodiments, the base station may transmit the barrage signal while the message requiring protection is being sent (or any other suitable time). In some embodiments, the base station may stop the transmission of the barrage signal after the message(s) have been sent (or any other suitable time).

In some embodiments, the base station may determine that a message to be sent to the wireless device includes an indication that the message should be protected, and in response to such determination may send scheduling information to the wireless device to enable the wireless device to send the channel feedback. For example, the base station may send scheduling information indicating a transmission opportunity and or uplink resources for the wireless device to use in sending back channel feedback to the base station. In some embodiments, the base station may determine whether a message to be sent to the wireless device includes an indication that the message should be protected. In response to determining that the message to be sent to the wireless device includes the indication that the message should be protected, the base station may send to the wireless device scheduling information to schedule the channel feedback. The base station may receive from the wireless device the channel feedback regarding the communication beam. The base station may then generate the barrage signal precoder based on the received channel feedback regarding the communication beam. In some embodiments, as indicated above, the base station may generate the communication beam precoder based on the received channel feedback regarding the communication beam, and may generate the barrage signal precoder based on the communication beam precoder.

FIG. 1 is a system block diagram illustrating an example communications system 100. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120*a*-120*e* in FIG. 1). The communications system 100 also may include a number of base stations (illustrated as the BS 110*a*, the BS 110*b*, the BS 110*c*, and the BS 110*d*) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

A base station 110*a*-110*d* may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110*a* may be a macro BS for a macro cell 102*a*, a base station 110*b* may be a pico BS for a pico cell 102*b*, and a base station 110*c* may be a femto BS for a femto cell 102*c*. A base station 110*a*-110*d* may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110*a*-110*d* may be interconnected to one another as well as to one or more other base stations or network nodes (not illustrated) in the communications system 100 through various types of backhaul interfaces, such as a direct physical connection, a virtual network, or a combination thereof using any suitable transport network The base station 110*a*-110*d* may communicate with the core network 140 over a wired or wireless communication link 126. The wireless device 120*a*-120*e* may communicate with the base station 110*a*-110*d* over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110*d*). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110*d* may communicate with macro the base station 110*a* and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120*a*, 120*b*, 120*c* may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices (for example, illustrated as the wireless device 120a and the wireless device 120e) may communicate directly using one or more sidelink channels (for example, without using a base station 110a-d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 2:
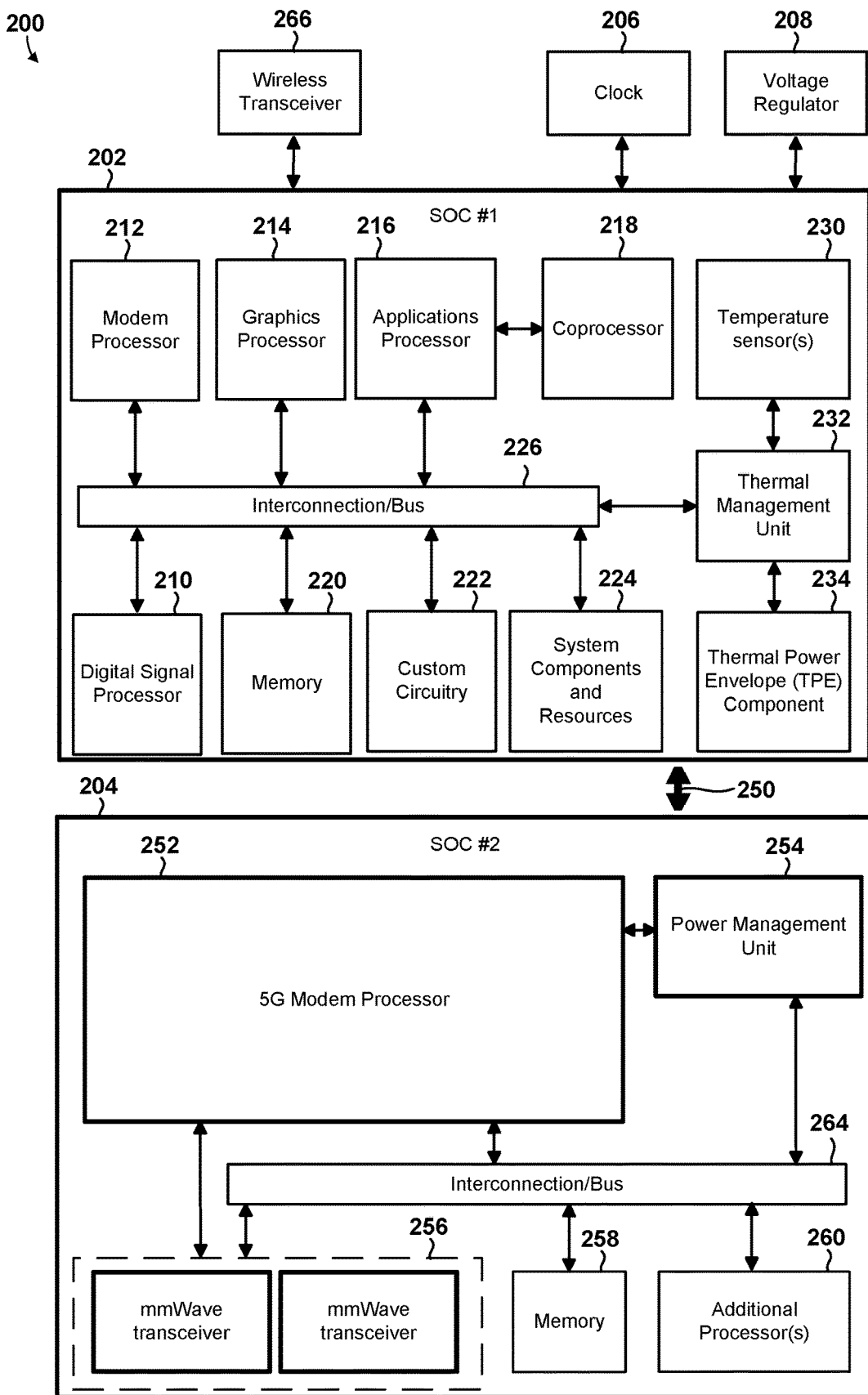
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 may operate as a central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
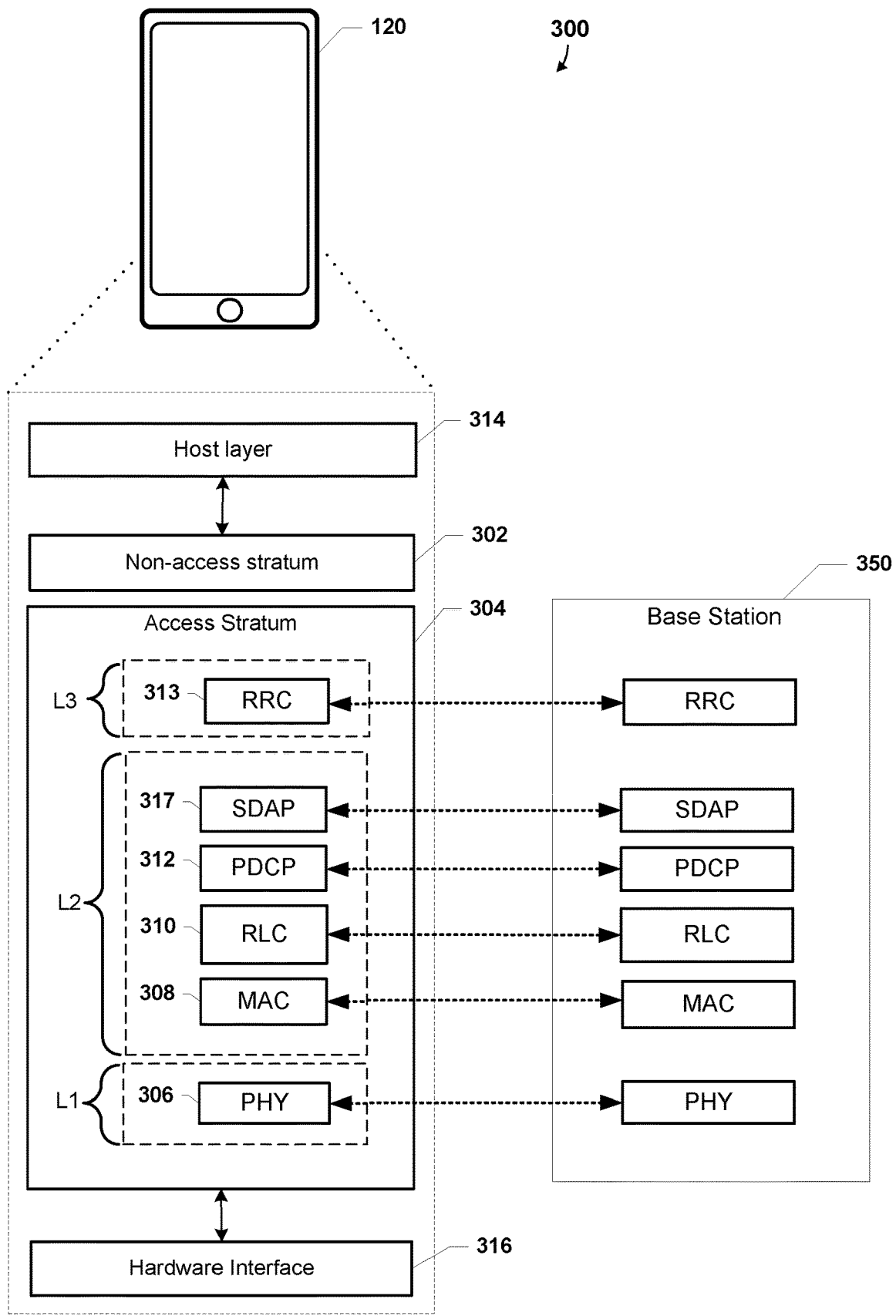
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to specific 5G-NR communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In some implementations, the SDAP sublayer 317 may provide mapping between Quality of Service (QoS) flows and data radio bearers (DRBs). In the downlink, at the base station 350, the SDAP sublayer 317 may provide mapping for DL QoS flows to DRBs. In the uplink, at the wireless device 120, the SDAP sublayer 317 may deliver DL received QoS flows to upper layers. In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
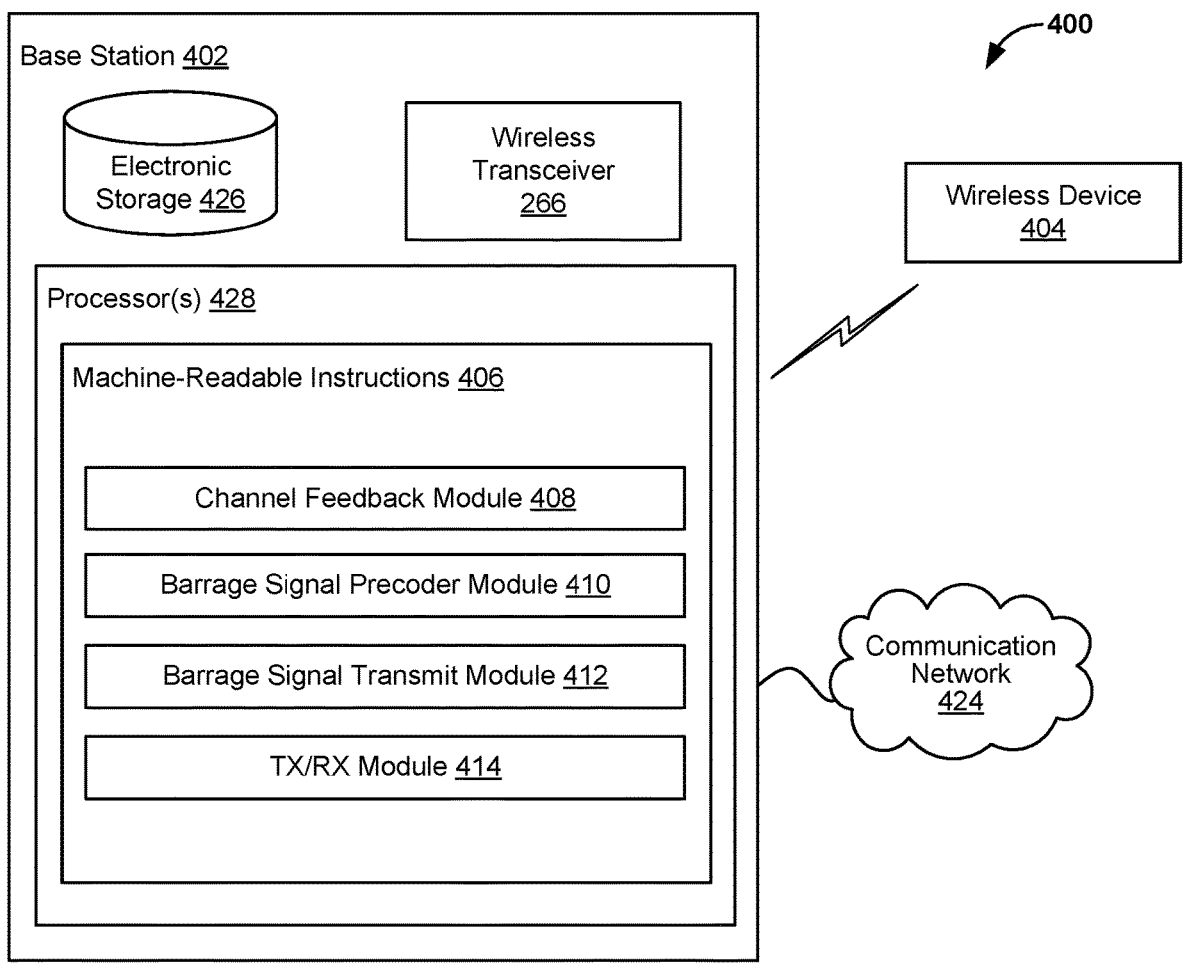
FIG. 4 is a component block diagram illustrating components and processing modules of a base station suitable for use with various embodiments.

FIG. 4 is a component block diagram illustrating a system 400 configured for enhancing coverage for initial access accordance with various embodiments. With reference to FIGS. 1-4, system 400 may include a base station 402 and a wireless device 404 (e.g., 110a-110d, 120a-120e, 200, 320, 350). The base station 402 and the wireless device 404 exchange wireless communications in order to establish a wireless communication link 122, 124, 126.

The base station 402 may include one or more processors 428 coupled to electronic storage 426 and a wireless transceiver (e.g., 266). In the base station 402 and the wireless device 404, the wireless transceiver 266 may be configured to receive messages sent in transmissions and pass such message to the processor(s) 428 for processing. Similarly, the one or more processors 428 may be configured to send messages for transmission to the wireless transceiver 266 for transmission. The one or more processors 428 may be configured by machine-readable instructions 406, which may be stored in electronic storage 424 before execution. The machine-readable instructions 406 may include one or more instruction modules. The instruction modules may include computer program modules. The instruction modules may include one or more of a channel feedback module 408, a barrage signal precoder module 410, a barrage signal transmit module 412, and a transmit/receive (TX/RX) module 414, as well as other instruction modules.

The channel feedback module 408 may be configured to receive, from a wireless device, channel feedback from a wireless device regarding a communication beam between the base station and the wireless device The barrage signal precoder module 410 may be configured to generate a barrage signal precoder based on the received channel feedback regarding the communication beam.

The barrage signal transmit module 412 may be configured to transmit a barrage signal using the barrage signal precoder on a second beam that is different from the communication beam.

The TX/RX module 414 may be configured to control the transmission and reception of wireless communications with the wireless device 402, e.g., via the wireless transceiver 266.

The example illustrated in FIG. 4 implementing transmission of the barrage signal and control of transmission and reception of wireless communication in separate modules is intended as a non-limiting example embodiment. In some embodiments, functionalities of transmitting the barrage signal using the barrage signal precoder on a second beam that is different from the communication beam may be accomplished by the same module that is configured to control the transmission and reception of wireless communications with the wireless device 402. For example, the TX/RX module 414 may be configured to transmit the barrage signal using the barrage signal precoder as part of controlling the transmission and reception of wireless communications with the wireless device 402.

In some embodiments, the base station 402 and the wireless device 404 may be operatively linked via one or more electronic communication links (e.g., wireless communication link 122, 124, 126). It will be appreciated that this is not intended to be limiting, and that the scope of this disclosure includes embodiments in which the base station 402 and the wireless device 404 may be operatively linked via some other communication medium.

The electronic storage 426 may include non-transitory storage media that electronically stores information. The electronic storage media of electronic storage 426 may include one or both of system storage that is provided integrally (i.e., substantially non-removable) with the base station 402 and/or removable storage that is removably connectable to the base station 402 via, for example, a port (e.g., a universal serial bus (USB) port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from the communication network and/or the wireless device 404, or other information that enables the base station 402 to function as described herein.

Processor(s) 428 may be configured to provide information processing capabilities in the base station 402. As such, the processor(s) 428 may include one or more of a digital processor, an analog processor, a digital circuit designed to process information, an analog circuit designed to process information, a state machine, and/or other mechanisms for electronically processing information. Although the processor(s) 428 are illustrated as single entities, this is for illustrative purposes only. In some embodiments, the processor(s) 428 may include a plurality of processing units and/or processor cores. The processing units may be physically located within the same device, or processor(s) 428 may represent processing functionality of a plurality of devices operating in coordination. The processor(s) 428 may be configured to execute modules 408-414 and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 described below is for illustrative purposes, and is not intended to be limiting, as any of modules 408-414 may provide more or less functionality than is described. For example, one or more of the modules 408-414 may be eliminated, and some or all of its functionality may be provided by other modules 408-414. As another example, the processor(s) 428 may be configured to execute one or more additional modules that may perform some or all of the functionality attributed below to one of the modules 408-414.

Figure 5A:
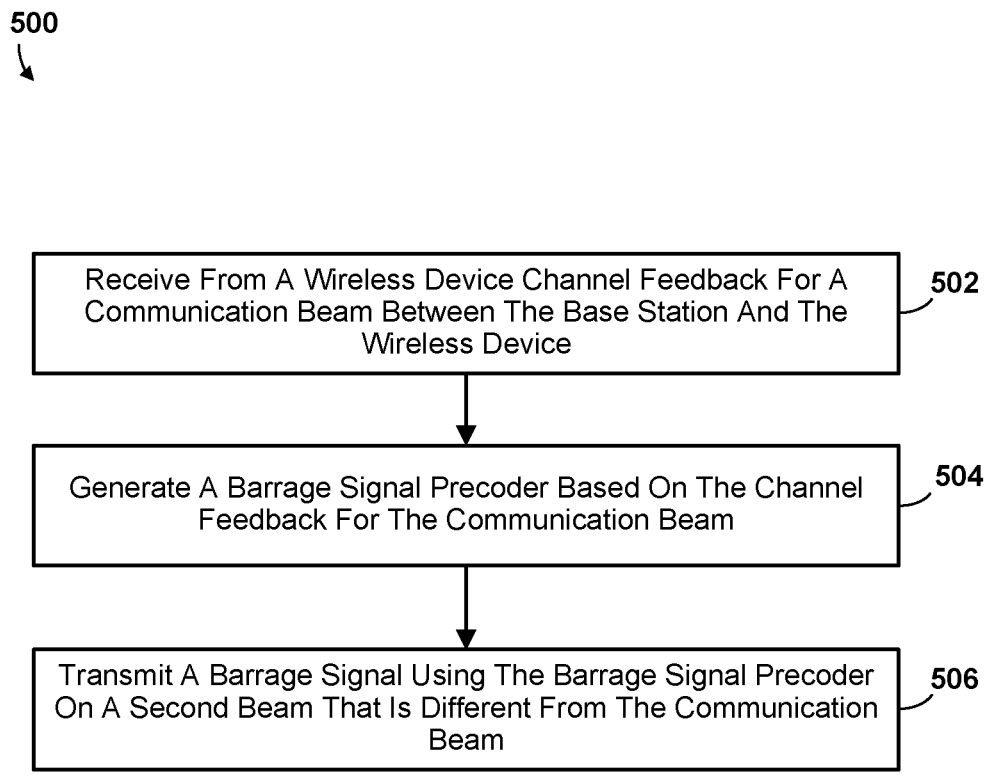
FIG. 5A is a process flow diagram illustrating a method performed by a processor of a base station for protecting wireless communications according to various embodiments.
Figure 5B:
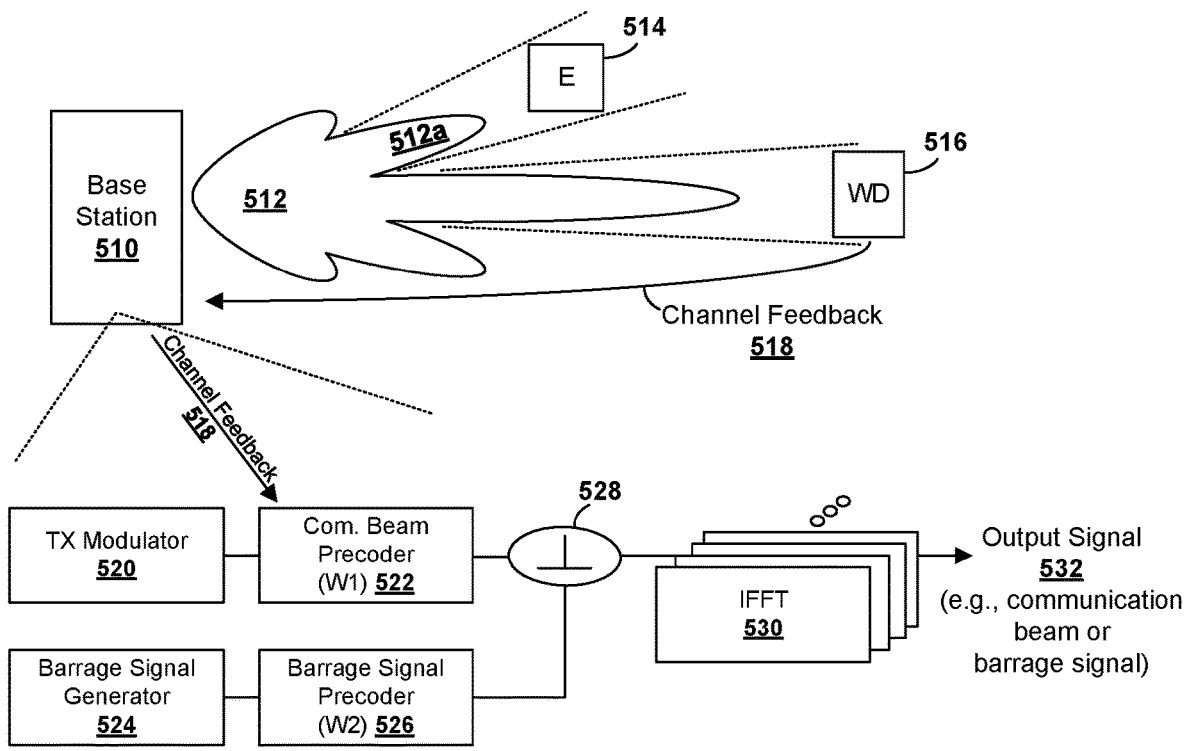
FIG. 5B is a conceptual diagram illustrating aspects of the method for protecting wireless communications according to various embodiments.

FIG. 5A is a process flow diagram illustrating a method 500 that may be performed by a processor of a base station device for protecting wireless communications according to various embodiments. FIG. 5B is a conceptual diagram illustrating aspects of the method 500 for protecting wireless communications according to various embodiments. With reference to FIGS. 1-5B, the operations of the method 500 may be performed by a processor (such as the processor 210, 212, 214, 216, 218, 252, 260, 428) of a base station device (such as the base station 110a-110d, 200, 350, 402).

In block 502, the processor may receive, from a wireless device, channel feedback from the wireless device regarding a communication beam between the base station and the wireless device. For example, a base station 510 may receive channel feedback 518 for a communication beam 512 from a wireless device (WD) 516. In some embodiments, the channel feedback may include CSI, an SRS, or another suitable message or signal received by the base station from the wireless device that provides information about one or more parameters of the communication beam between the base station on the wireless device. As noted above, in some embodiments, the communication beam 512 may include one or more sidelobes 512a, which an eavesdropper (E) 514 may use to attempt to receive or otherwise intercept the communication beam 512. Means for performing functions of the operations in block 502 may include the processor (e.g., 210, 212, 214, 216, 218, 252, 260, 428) and the wireless transceiver (e.g., 266).

In block 504, the processor may generate a barrage signal precoder based on the received channel feedback regarding the communication beam. For example, the processor may generate barrage signal precoder (W2) 526 based on the channel feedback 518. In some embodiments, a transmit (TX) modulator 520 may refer to a multiple access transmission of a 5G NR signal and carry 5G user plan transmission in a downlink signal from a base station to a wireless device. In some embodiments, a multiple access transmission of a 5G NR signal may be defined in a technical standard, such as TS 38.212, TS 38.211, or another suitable technical standard. In some embodiments, the processor may generate a communication beam precoder (W1) 522 based on the received channel feedback regarding the communication beam. In such embodiments, the processor may generate the barrage signal precoder (W2) 526 based on the communication beam precoder (W1) 522. In some embodiments, the processor may provide an output of the barrage signal precoder (W2) 526 to an orthogonality function 528. The processor may transform the output of the orthogonality function 528 by an inverse fast Fourier transform (IFFT) 530 to produce an output signal 532 (e.g., the barrage signal). In some embodiments, the generated barrage signal precoder is different from to the beam precoder. In particular embodiments, the generated barrage signal precoder is orthogonal to the beam precoder that is designed for a user plane (e.g., an information signal between the base station 510 and the wireless device 516) in order to reduce interference imposed on the user plane by the barrage precoder. In some embodiments, the barrage signal may include band limited pseudo noise generated by the barrage signal generator 524 that may be spatially colored by the barrage signal precoder 526. Means for performing functions of the operations in block 504 may include the processor (e.g., 210, 212, 214, 216, 218, 252, 260, 428).

In block 506, the processor may transmit a barrage signal using the barrage signal precoder on a second beam that is different from the communication beam. For example, the processor may transmit the barrage signal that is output as output signal 532 on a beam in the direction of the eavesdropper (E) 514 and/or in the direction of the sidelobe 512a. In some embodiments, the processor may transmit the barrage signal on a second beam in a sidelobe (e.g., 512a) of the communication beam (e.g., 512). Means for performing functions of the operations in block 506 may include the processor (e.g., 210, 212, 214, 216, 218, 252, 260, 428) and the wireless transceiver (e.g., 266).

Figure 6A:
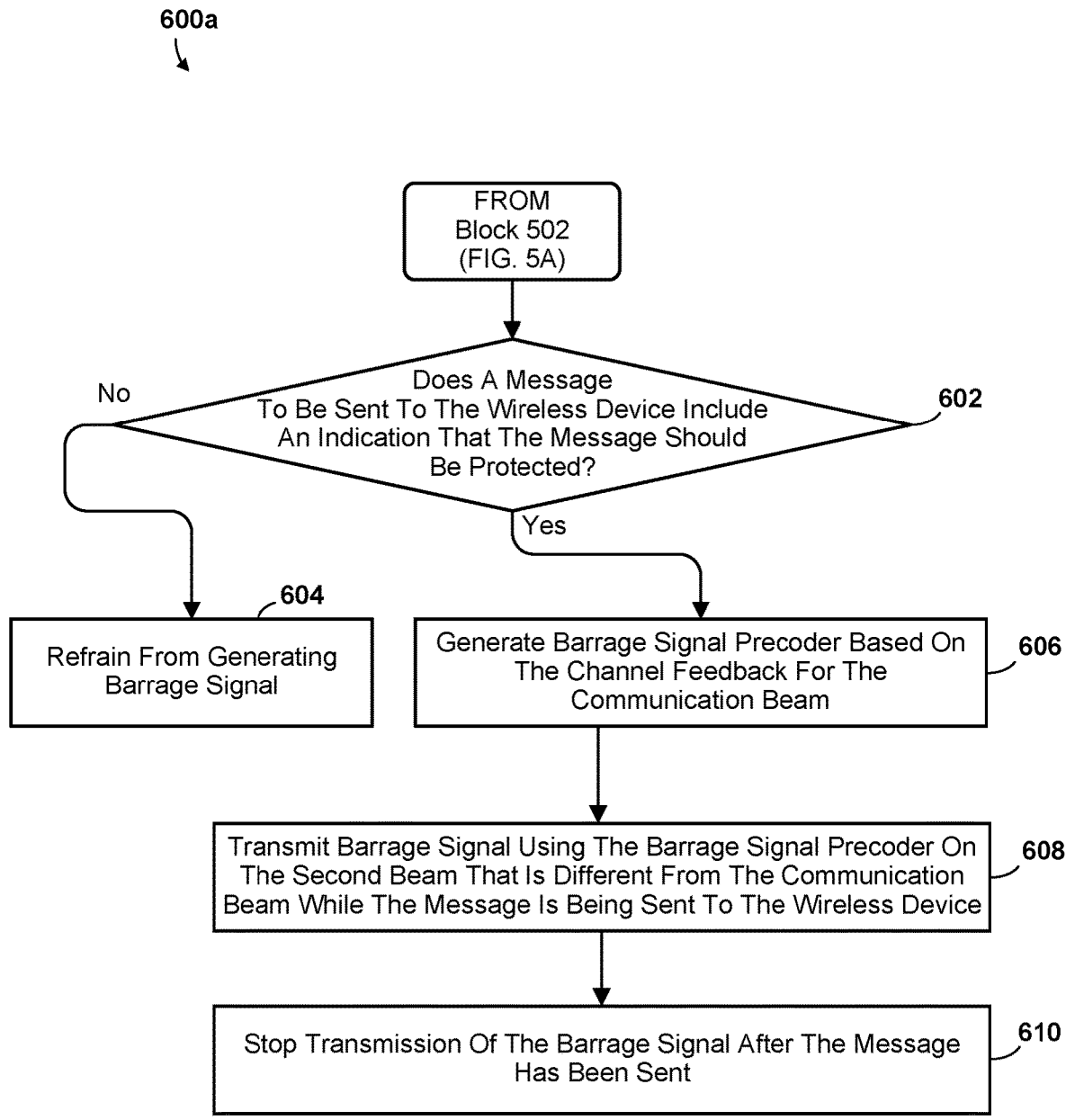
FIGS. 6A-6C are process flow diagrams that illustrate operations that may be performed as part of the method for protecting wireless communications according to various embodiments.
Figure 6B:
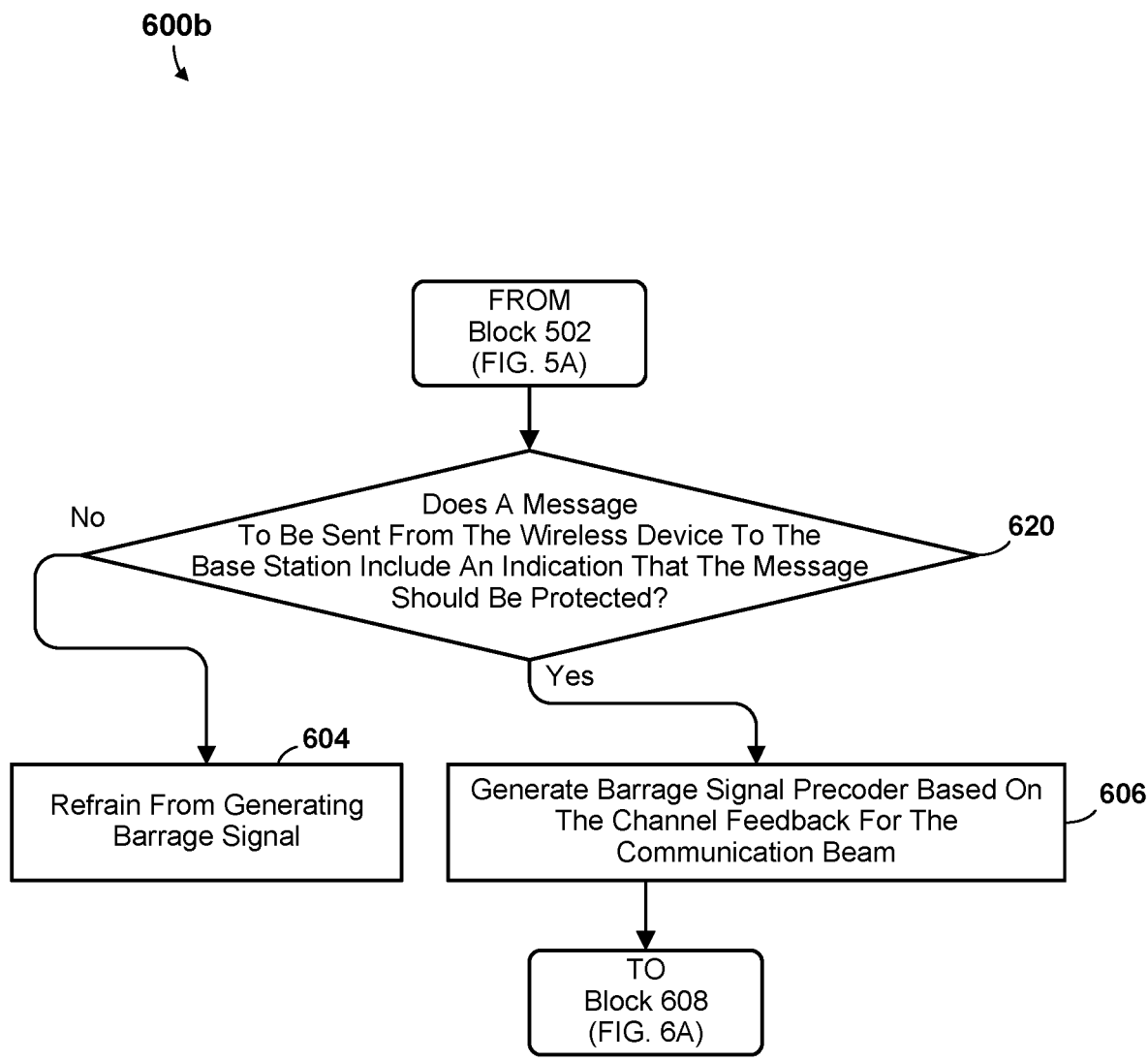
Figure 6C:
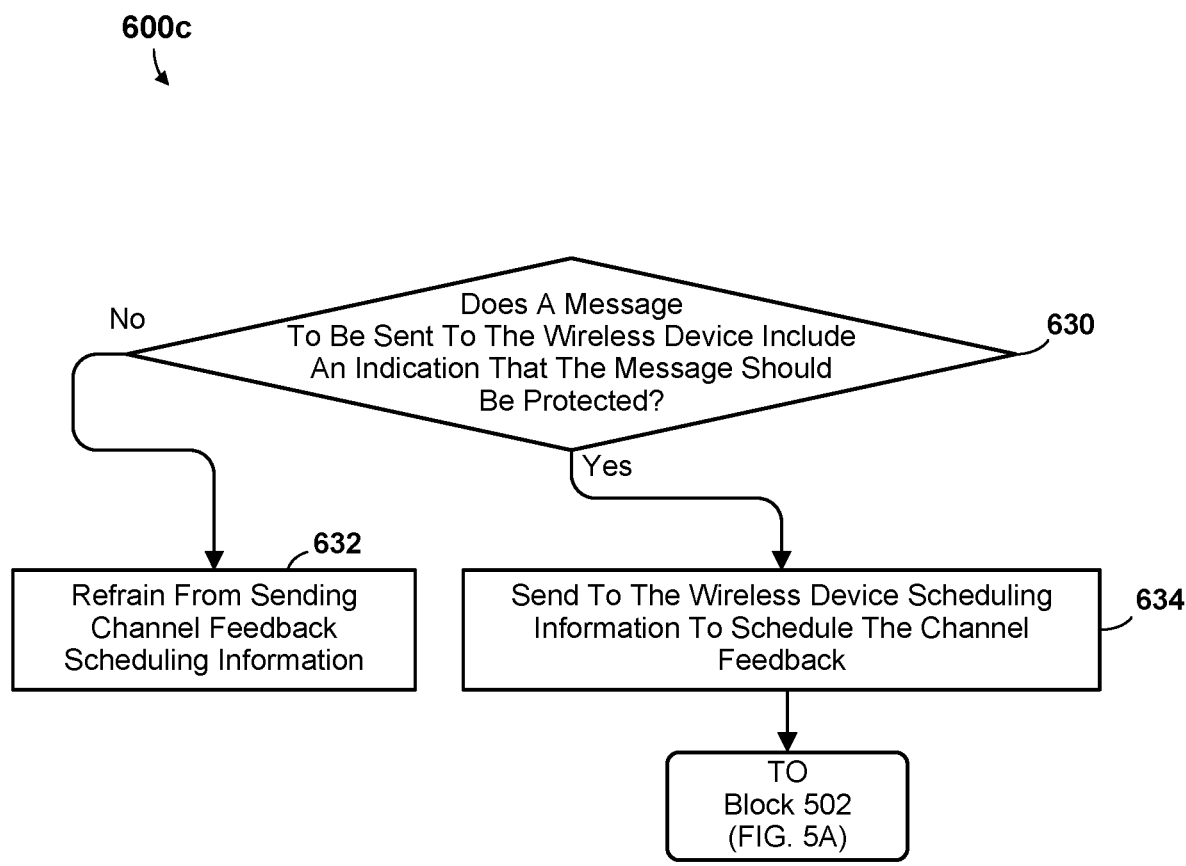

FIGS. 6A-6C are process flow diagrams illustrating operations 600a-600c that may be performed by a processor of a base station as part of the method 500 for protecting wireless communications, according to various embodiments. With reference to FIGS. 1-6C, the operations 600a-6900c may be performed by a processor (such as the processor 210, 212, 214, 216, 218, 252, 260, 432) of a base station device (such as the base station 110a-110d, 200, 350, 402).

Referring to FIG. 6A, following the performance of the operations of block 502 (FIG. 5A), the processor may determine whether a message to be sent to the wireless device includes an indication that the message should be protected in determination block 602. In some embodiments, the message that should be protected may include a message or messages with confidential information, private information, or other information or message content to be protected against interception or eavesdropping. In some embodiments, the message may include an encryption key, an authentication token, a security certificate, or another message or information suitable for use in protecting a communication or validating or authenticating the wireless device.

In some embodiments, the message may be associated with or may include an indication that the message should be protected. In some embodiments, a message may include a Quality of Service (QOS) indication (such as a flag, a bit, or another suitable indication) that the message should be protected. In some embodiments, the base station may receive control signaling or out-of-band signaling indicating that the message should be protected. In some embodiments, the message may be associated with metadata indicating that the message should be protected. In some embodiments, a data packet of the message may include the indication in a packet header or in a packet payload that a message in the data packet or in other data packets should be protected. Other suitable indications may be used in some embodiments. Means for performing functions of the operations in determination block 602 may include the processor (e.g., 210, 212, 214, 216, 218, 252, 260, 428).

In response to determining that the message to be sent to the wireless device does not include an indication that the message should be protected (i.e., determination block 602="No"), the processor may refrain from generating a barrage signal in block 604.

In response to determining that the message to be sent to the wireless device includes an indication that the message should be protected (i.e., determination block 602="Yes"), the processor may generate the barrage signal precoder based on the received channel feedback regarding the communication beam in block 606. Means for performing functions of the operations in block 606 may include the processor (e.g., 210, 212, 214, 216, 218, 252, 260, 428).

In block 608, the processor may transmit a barrage signal using the barrage signal precoder on the second beam that is different from the communication beam while the message is being sent to the wireless device. Means for performing functions of the operations in block 608 may include the processor (e.g., 210, 212, 214, 216, 218, 252, 260, 428) and the wireless transceiver (e.g., 266).

In block 610, the processor may stop transmission of the barrage signal after the message has been sent. Means for performing functions of the operations in block 610 may include the processor (e.g., 210, 212, 214, 216, 218, 252, 260, 428) and the wireless transceiver (e.g., 266).

Referring to FIG. 6B, following the performance of the operations of block 502 (FIG. 5A), the processor may determine whether a message to be sent from the wireless device to the base station includes an indication that the message should be protected in determination block 620. In some embodiments, the message that should be protected may include a message or messages with confidential information, private information, or other information or message content to be protected against interception or eavesdropping. In some embodiments, the message may include an encryption key, an authentication token, a security certificate, or another message or information suitable for use in protecting a communication or validating or authenticating the wireless device. In some embodiments, the indication that the message should be protected may include control signaling or out-of-band signaling, metadata associated with the message, information associated with a scheduling request from the wireless device requesting uplink transmission resources, information associated with channel feedback (e.g., CSI or an SRS) sent from the wireless device to the base station, or another suitable indication. Means for performing functions of the operations in determination block 620 may include the processor (e.g., 210, 212, 214, 216, 218, 252, 260, 428).

In response to determining that the message to be sent to the wireless device does not include an indication that the message should be protected (i.e., determination block 602="No"), the processor may refrain from generating a barrage signal in block 604 as described.

In response to determining that the message to be sent to the wireless device includes an indication that the message should be protected (i.e., determination block 602="Yes"), the processor may generate the barrage signal precoder based on the received channel feedback regarding the communication beam in block 606 as described.

The processor may then perform the operations of block 608 (FIG. 6A) as described.

Referring to FIG. 6C, in some embodiments, the base station may determine that a message to be sent to the wireless device includes an indication that the message should be protected, and in response to such determination may send scheduling information to the wireless device to enable the wireless device to send the channel feedback. For example, the base station may send scheduling information indicating a transmission opportunity and or uplink resources for the wireless device to use in sending back channel feedback to the base station.

In some embodiments, in determination block 630, the base station may determine whether a message to be sent to the wireless device includes an indication that the message should be protected.

In response to determining that the message to be sent to the wireless device does not include an indication that the message should be protected (i.e., determination block 630="No"), the processor may refrain from sending the channel feedback scheduling information to the wireless device in block 632.

In response to determining that the message to be sent to the wireless device includes an indication that the message should be protected (i.e., determination block 630="Yes"), the processor may send to the wireless device the scheduling information to schedule the channel feedback in block 634. Means for performing functions of the operations in block 634 may include the processor (e.g., 210, 212, 214, 216, 218, 252, 260, 428) and the wireless transceiver (e.g., 266).

The processor may then perform the operations of block 502 (FIG. 5A) as described.

Figure 7:
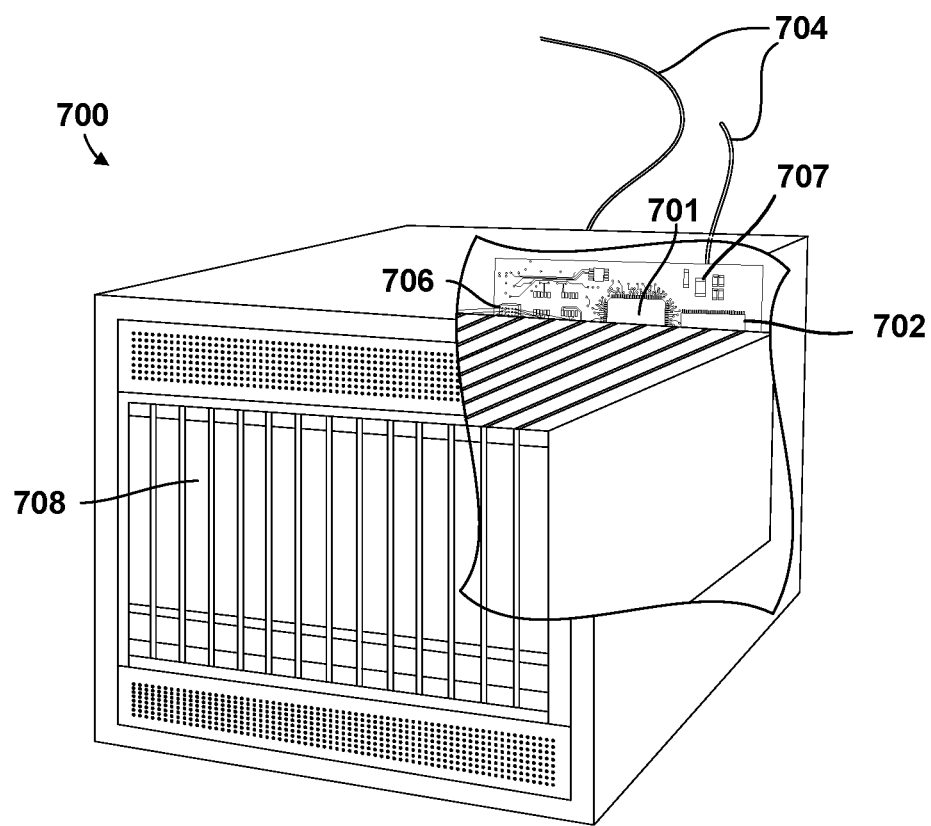
FIG. 7 is a component block diagram of a base station computing device suitable for use with various embodiments.

FIG. 7 is a component block diagram of a base station computing device suitable for use with various embodiments. Such base station computing devices (e.g., base station 110*a*-110*d*, 350, 402) may include at least the components illustrated in FIG. 7. With reference to FIGS. 1-7, the base station computing device 700 may typically include a processor 701 coupled to volatile memory 702 and a large capacity nonvolatile memory, such as a disk drive 708. The base station computing device 700 also may include a peripheral memory access device 706 such as a floppy disc drive, compact disc (CD) or digital video disc (DVD) drive coupled to the processor 701. The base station computing device 700 also may include network access ports 704 (or interfaces) coupled to the processor 701 for establishing data connections with a network, such as the Internet or a local area network coupled to other system computers and servers. The base station computing device 700 may include one or more antennas 707 for sending and receiving electromagnetic radiation that may be connected to a wireless communication link. The base station computing device 700 may include additional access ports, such as USB, Firewire, Thunderbolt, and the like for coupling to peripherals, external memory, or other devices.

Figure 8:
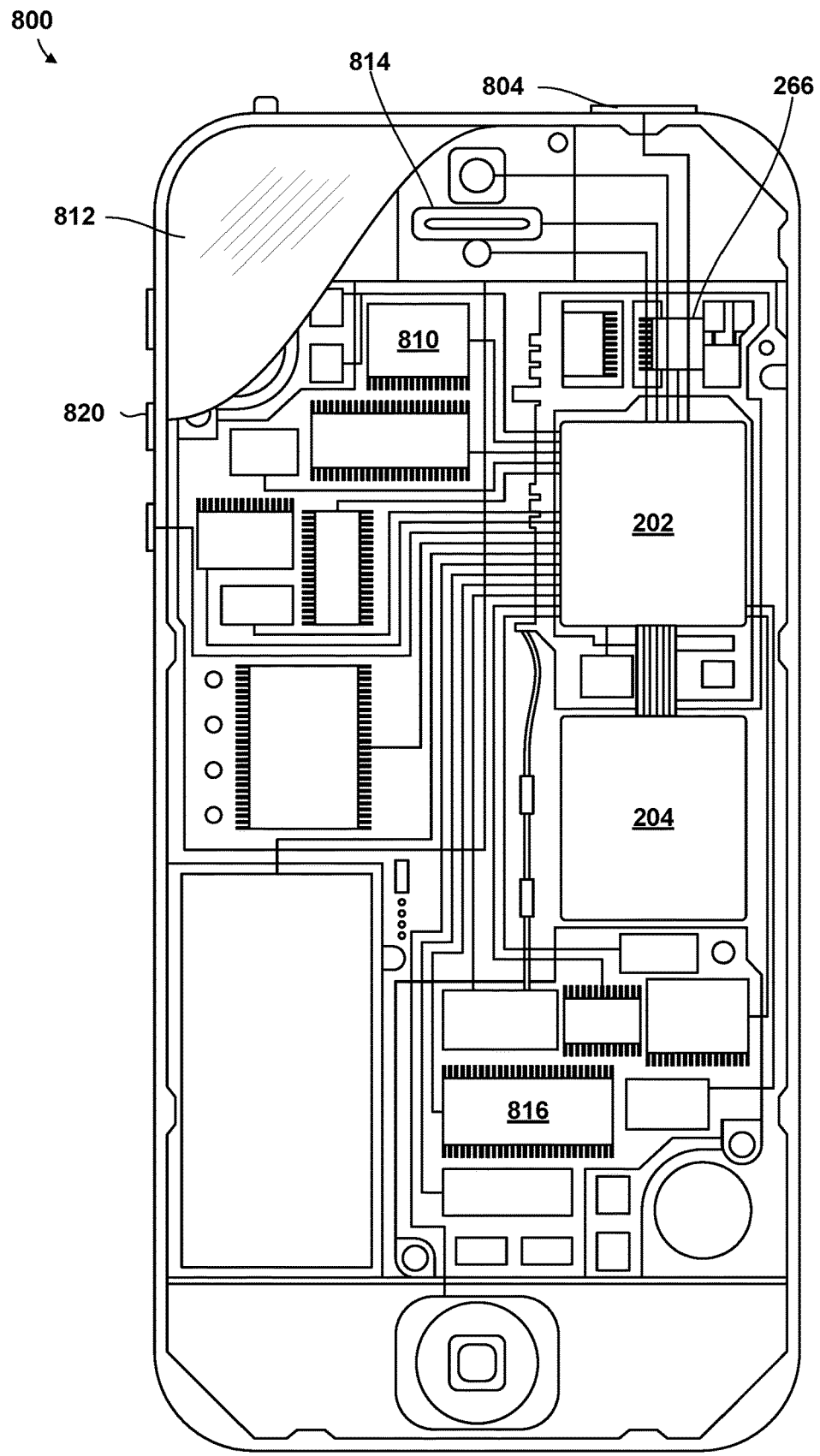
FIG. 8 is a component block diagram of a wireless device suitable for use with various embodiments.

FIG. 8 is a component block diagram of a wireless device 800 suitable for use with various embodiments. With reference to FIGS. 1-8, various embodiments may be implemented on a variety of wireless devices 800 (for example, the wireless device 120a-120e, 200, 320, 404), an example of which is illustrated in FIG. 8 in the form of a smartphone. The wireless device 800 may include a first SOC 202 (for example, a SOC-CPU) coupled to a second SOC 204 (for example, a 5G capable SOC). The first and second SOCs 202, 204 may be coupled to internal memory 816, a display 812, and to a speaker 814. Additionally, the wireless device 800 may include an antenna 804 for sending and receiving electromagnetic radiation that may be connected to a wireless data link or cellular telephone transceiver 266 coupled to one or more processors in the first and/or second SOCs 202, 204. Wireless device 800 also may include menu selection buttons or rocker switches 820 for receiving user inputs.

The wireless device 800 wireless device 800 may include a sound encoding/decoding (CODEC) circuit 810, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 810 may include a digital signal processor (DSP) circuit (not shown separately).

The processors of the base station computing device 700 and the wireless device 800 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 702, 816 before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a base station comprising a processor configured with processor-executable instructions to perform operations of the methods of the following implementation examples, the example methods discussed in the following paragraphs implemented by a base station comprising means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1. A method performed by a processor of a base station for protecting wireless communications, including: receiving, from a wireless device, channel feedback from a wireless device regarding a communication beam between the base station and the wireless device; generating a barrage signal precoder based on the received channel feedback regarding the communication beam; and transmitting a barrage signal using the barrage signal precoder on a second beam that is different from the communication beam.

Example 2. The method of example 1, in which generating a barrage signal precoder based on the received channel feedback regarding the communication beam includes: generating a communication beam precoder based on the received channel feedback regarding the communication beam; and generating the barrage signal precoder based on the communication beam precoder.

Example 3. The method of any of examples 1 and 2, in which the generated barrage signal precoder is orthogonal to the communication beam precoder.

Example 4. The method of any of examples 1-3, in which transmitting a barrage signal using the barrage signal precoder on a second beam that is different from the communication beam includes transmitting the barrage signal on the second beam in a sidelobe of the communication beam.

Example 5. The method of any of examples 1-4, in which generating a barrage signal precoder based on the received channel feedback regarding the communication beam includes: determining whether a message to be sent to the wireless device includes an indication that the message should be protected; and generating the barrage signal precoder based on the received channel feedback regarding the communication beam in response to determining that the message to be sent to the wireless device includes the indication that the message should be protected.

Example 6. The method of any of examples 1-5, in which generating a barrage signal precoder based on the received channel feedback regarding the communication beam includes: determining whether a message to be sent from the wireless device to the base station includes an indication that the message should be protected; and generating the barrage signal precoder based on the received channel feedback regarding the communication beam in response to determining that the message to be sent to the wireless device includes the indication that the message should be protected.

Example 7. The method of any of examples 1-6, in which transmitting a barrage signal using the barrage signal precoder on a second beam that is different from the communication beam includes transmitting a barrage signal using the barrage signal precoder on the second beam that is different from the communication beam while a message to be protected is being sent between the base station and the wireless device.

Example 8. The method of example 7, further including stopping the transmission of the barrage signal after the message to be protected has been sent.

Example 9. The method of any of examples 1-8, in which receiving, from a wireless device, channel feedback from a wireless device regarding a communication beam between the base station and the wireless device includes: determining whether a message to be sent to the wireless device includes an indication that the message should be protected; sending to the wireless device scheduling information to schedule the channel feedback in response to determining that the message to be sent to the wireless device includes the indication that the message should be protected; and receiving from the wireless device the channel feedback regarding the communication beam between the base station and the wireless device according to the scheduling information.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500, 600a, 600b, and 600c may be substituted for or combined with one or more operations of the methods and operations 500, 600a, 600b, and 600c.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a base station for protecting wireless communications, comprising:
    receiving, from a wireless device, channel feedback from a wireless device regarding a communication beam between the base station and the wireless device;
    generating a barrage signal precoder based on the received channel feedback regarding the communication beam; and
    transmitting a barrage signal using the barrage signal precoder on a second beam in a sidelobe of the communication beam.

2. The method of claim 1, wherein generating a barrage signal precoder based on the received channel feedback regarding the communication beam comprises:
    generating a communication beam precoder based on the received channel feedback regarding the communication beam; and
    generating the barrage signal precoder based on the communication beam precoder.

3. The method of claim 2, wherein the generated barrage signal precoder is orthogonal to the communication beam precoder.

4. The method of claim 1, wherein generating a barrage signal precoder based on the received channel feedback regarding the communication beam comprises:
    determining whether a message to be sent to the wireless device includes an indication that the message should be protected; and
    generating the barrage signal precoder based on the received channel feedback regarding the communication beam in response to determining that the message to be sent to the wireless device includes the indication that the message should be protected.

5. The method of claim 1, wherein generating a barrage signal precoder based on the received channel feedback regarding the communication beam comprises:
    determining whether a message to be sent from the wireless device to the base station includes an indication that the message should be protected; and
    generating the barrage signal precoder based on the received channel feedback regarding the communication beam in response to determining that the message to be sent to the wireless device includes the indication that the message should be protected.

6. The method of claim 1, wherein transmitting a barrage signal using the barrage signal precoder on a second beam in a sidelobe of the communication beam comprises transmitting a barrage signal using the barrage signal precoder on the second beam in a sidelobe of the communication beam while a message to be protected is being sent between the base station and the wireless device.

7. The method of claim 6, further comprising stopping transmission of the barrage signal after the message to be protected has been sent.

8. The method of claim 1, wherein receiving, from a wireless device, channel feedback from a wireless device regarding a communication beam between the base station and the wireless device comprises:
    determining whether a message to be sent to the wireless device includes an indication that the message should be protected;
    sending to the wireless device scheduling information to schedule the channel feedback in response to determining that the message to be sent to the wireless device includes the indication that the message should be protected; and
    receiving from the wireless device the channel feedback regarding the communication beam between the base station and the wireless device according to the scheduling information.

9. A base station, comprising:
    a processor configured with processor-executable instructions to:
        receive from a wireless device channel feedback from a wireless device regarding a communication beam between the base station and the wireless device;
        generate a barrage signal precoder based on the received channel feedback regarding the communication beam; and
        transmit a barrage signal using the barrage signal precoder on a second beam in a sidelobe of the communication beam.

10. The base station of claim 9, wherein the processor is further configured with processor-executable instructions to:
    generate a communication beam precoder based on the received channel feedback regarding the communication beam; and
    generate the barrage signal precoder based on the communication beam precoder.

11. The base station of claim 10, wherein the generated barrage signal precoder is orthogonal to the communication beam precoder.

12. The base station of claim 9, wherein the processor is further configured with processor-executable instructions to
    determine whether a message to be sent to the wireless device includes an indication that the message should be protected; and
    generate the barrage signal precoder based on the received channel feedback regarding the communication beam in response to determining that the message to be sent to the wireless device includes the indication that the message should be protected.

13. The base station of claim 9, wherein the processor is further configured with processor-executable instructions to:
    determine whether a message to be sent from the wireless device to the base station includes an indication that the message should be protected; and
    generate the barrage signal precoder based on the received channel feedback regarding the communication beam in response to determining that the message to be sent to the wireless device includes the indication that the message should be protected.

14. The base station of claim 9, wherein the processor is further configured with processor-executable instructions to transmit a barrage signal using the barrage signal precoder on the second beam in a sidelobe of the communication beam while a message to be protected is being sent between the base station and the wireless device.

15. The base station of claim 14, wherein the processor is further configured with processor-executable instructions to stop transmission of the barrage signal after the message to be protected has been sent.

16. The base station of claim 9, wherein the processor is further configured with processor-executable instructions to:
  determine whether a message to be sent to the wireless device includes an indication that the message should be protected;
  send to the wireless device scheduling information to schedule channel feedback in response to determining that the message to be sent to the wireless device includes the indication that the message should be protected; and
  receive from the wireless device the channel feedback regarding the communication beam between the base station and the wireless device according to the scheduling information.

17. A non-transitory processor-readable medium having stored thereon processor-executable instruction configured to cause a processing device in a base station to perform operations comprising:
  receiving, from a wireless device, channel feedback from a wireless device regarding a communication beam between the base station and the wireless device;
  generating a barrage signal precoder based on the received channel feedback regarding the communication beam; and
  transmitting a barrage signal using the barrage signal precoder on a second beam in a sidelobe of the communication beam.

18. The non-transitory processor-readable medium of claim 17, wherein the stored processor-executable instructions are configured to cause a processor of a wireless device to perform operations such that 1 generating a barrage signal precoder based on the received channel feedback regarding the communication beam comprises:
  generating a communication beam precoder based on the received channel feedback regarding the communication beam; and
  generating the barrage signal precoder based on the communication beam precoder.

* * * * *